(12) United States Patent
Gibson et al.

(10) Patent No.: US 9,096,455 B2
(45) Date of Patent: Aug. 4, 2015

(54) PHOTONIC BAND GAP FIBERS USING A JACKET WITH A DEPRESSED SOFTENING TEMPERATURE

(75) Inventors: Daniel J. Gibson, Cheverly, MD (US); Jasbinder S. Sanghera, Ashburn, VA (US); Frederic H. Kung, Alexandria, VA (US); Ishwar D. Aggarwal, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 209 days.

(21) Appl. No.: 12/960,638

(22) Filed: Dec. 6, 2010

(65) Prior Publication Data
US 2012/0141079 A1 Jun. 7, 2012

(51) Int. Cl.
C03B 37/027 (2006.01)
C03B 37/075 (2006.01)
C03B 37/012 (2006.01)
G02B 6/02 (2006.01)

(52) U.S. Cl.
CPC ......... *C03B 37/0122* (2013.01); *C03B 37/0279* (2013.01); *C03B 2201/60* (2013.01); *C03B 2201/80* (2013.01); *C03B 2201/84* (2013.01); *C03B 2201/86* (2013.01); *C03B 2203/14* (2013.01); *C03B 2203/222* (2013.01); *C03B 2203/42* (2013.01); *G02B 6/02328* (2013.01); *G02B 6/02347* (2013.01)

(58) Field of Classification Search
None
See application file for complete search history.

(56) References Cited

U.S. PATENT DOCUMENTS

| 4,551,162 A * | 11/1985 | Hicks, Jr. ................. 65/393 |
| 6,847,771 B2 | 1/2005 | Fajardo et al. |
| 2004/0223715 A1* | 11/2004 | Benoit et al. ................. 385/123 |
| 2005/0074215 A1* | 4/2005 | Sanghera et al. ............. 385/125 |
| 2005/0259942 A1* | 11/2005 | Temelkuran et al. ......... 385/147 |
| 2006/0153512 A1* | 7/2006 | Falkenstein et al. ......... 385/125 |
| 2008/0087047 A1* | 4/2008 | Bayindir et al. ............. 65/389 |
| 2008/0141724 A1* | 6/2008 | Fuflyigin ................. 65/391 |

OTHER PUBLICATIONS

Russell, "Finding the Holey Grail", OPN Jul./Aug. 2007, pp. 26-31.*
Kim et al., "Control of hollow-core photonic bandgap fiber ellipticity by induced lateral tension", Optics Express vol. 17, No. 3, Feb. 2, 2009, pp. 1268-1273.*

(Continued)

*Primary Examiner* — Lisa Herring
(74) *Attorney, Agent, or Firm* — US Naval Research Laboratory; Rebecca L. Forman

(57) ABSTRACT

The present invention is generally directed to a photonic bad gap fiber and/or fiber preform with a central structured region comprising a first non-silica based glass and a jacket comprising a second non-silica based glass surrounding the central structured region, where the Littleton softening temperature of the second glass is at least one but no more than ten degrees Celsius lower than the Littleton softening temperature of the first glass, or where the base ten logarithm of the glass viscosity in poise of the second glass is at least 0.01 but no more than 2 lower than the base ten logarithm of the glass viscosity in poise of the first glass at a fiber draw temperature. Also disclosed is a method of making a photonic bad gap fiber and/or fiber preform.

4 Claims, 5 Drawing Sheets

(56) References Cited

OTHER PUBLICATIONS

Cregan et al., "Single-mode photonic band gap guidance of light in air," Science, 285 (5433), 1537-39 (1999).

Barkou et al., "Silica-air photonic crystal fiber design that permits waveguiding by a true photonic bandgap effect," Optics Letters, 24 (1), 46-48 (1999).

Venkataraman et al., "Low loss (13 dB/km) air core photonic bandgap fibre," ECOC, Postdeadline Paper PDA, Sep. 1, 2002.

* cited by examiner

PHOTONIC BAND GAP FIBERS USING A JACKET WITH A DEPRESSED SOFTENING TEMPERATURE

FIELD OF THE INVENTION

The present invention relates generally to photonic band gap fibers, and more specifically to non-silica glass based photonic band gap fibers.

BACKGROUND OF THE INVENTION

Hollow core photonic band gap (HC-PBG) fibers have been fabricated from silica glass and reported in the literature. See, e.g., Cregan et al., "Single-mode photonic bad gap guidance of light in air," Science, 285(5433), 1537-1539 (1999); Barkou et al., "Silica-air photonic crystal fiber design that permits waveguiding by a true photonic bandgap effect." Optics Letters, 24(1), 46-48 (1999); and Venkataraman et al., "Low loss (13 dB/km) air core photonic band-gap fibre," ECOC, Postdeadline Paper PD1. 1, September, 2002, all of which are incorporated herein by reference. FIG. 1 shows a schematic of the cross-section of a HC-PBG fiber. The periodic layered structure of air holes 100 and glass 110 creates a photonic band gap that prevents light from propagating in the structured region (analogous to a 2D grating) and so light is confined to the hollow core. Typically, the periodicity of the holes is on the scale of the wavelength of light and the outer glass is used for providing mechanical integrity to the fiber. The fact that light travels in the hollow core also means that the losses will be lower so longer path lengths can be used. Also, non-linear effects will be negligible and damage thresholds will be higher so that higher power laser energy can be transmitted through the fiber for military and commercial applications. Also, since light is guided in the hollow core, an analyte disposed therein will have maximum interaction with light, unlike traditional evanescent sensors.

The periodicity of the holes, the air fill fraction (defined by the ratio of void volume to solid material volume in the microstructured region, i.e., the region comprising the plurality of holes and solid material therebetween, and exclusive of the core and jacket regions), and the refractive index of the glass dictate the position of the photonic band gap, namely the transmission wavelengths confined to the hollow core and guided within the fiber. HC-PBG fibers are obtained by first making a structured fiber preform and then drawing this into a microstructured fiber with the correct overall dimensions. The fiber preform is typically comprised of a central structured region, which can be made, for example, by stacking tubes, extrusion or templating, which is inserted into a supportive outer jacket tube. This assembly process inevitably introduces voids between the central region and the outer jacket tube. These voids can be similarly sized to the intended holes in the structured region of the fiber preform, or even larger, and run the entire length of the fiber preform, therefore making fiberization difficult. This is especially true for specialty oxide and non-oxide glasses where the vapor pressure during fiberization may be sufficient to prevent collapse of these interstitial voids.

In the fabrication of silica glass microstructured fibers, there is at least one method where the softening point temperature of the inner structured region is higher than that of the outer jacket by at least 50° C. but no more than 150° C., such that during fiberization the structured region remains relatively firm and is less susceptible to deformation (U.S. Pat. No. 6,847,771 to Fajardo et al., the entire contents of which is incorporated herein by reference). However, this method does not work for non silica specialty glasses, especially non-oxides and chalcogenides, due to their low softening temperatures and higher vapor pressures.

There are no HC-PBG fibers reported using specialty glasses. This is partly due to the fact that high air fractions are needed. Specialty glasses tend to be more fragile and, therefore, difficult to make and handle the microstructured fiber preforms.

BRIEF SUMMARY OF THE INVENTION

The aforementioned problems are overcome in the present invention which provides a photonic bad gap fiber and/or fiber preform with a central structured region comprising a first non-silica based glass and a jacket comprising a second non-silica based glass surrounding the central structured region, where the Littleton softening temperature, i.e. the temperature at which a glass has a viscosity of $10^{7.6}$ poises, of the second glass is at least one but no more than ten degrees Celsius lower than the Littleton softening temperature of the first glass, or where the base ten logarithm of the glass viscosity in poise of the second glass is at least 0.01 but no more than 2 lower than the base ten logarithm of the glass viscosity in poise of the first glass at a fiber draw temperature ($T_{draw}$). The present invention also provides a method of making a photonic bad gap fiber and/or fiber preform.

The HC-PBG fibers and fiber preforms of the present invention may be used in many applications. Some examples include facility clean up, biomedical analysis (e.g., glucose, blood, breath, etc.), CBW (chemical and biological warfare) agent detection, toxic and hazardous chemical detection, and environmental pollution monitoring and process control. In addition to chemical sensing, the HC-PBG fibers may be used for very high laser power delivery since the light is predominantly guided in the hollow core, unlike in traditional fibers which possess a solid core that will be damaged at high powers.

These and other features and advantages of the invention, as well as the invention itself, will become better understood by reference to the following detailed description, appended claims, and accompanying drawings.

$$\text{Fill} = \frac{\pi a^2}{\Lambda^2 \frac{\sqrt{3}}{2}}.$$

Figure 2:
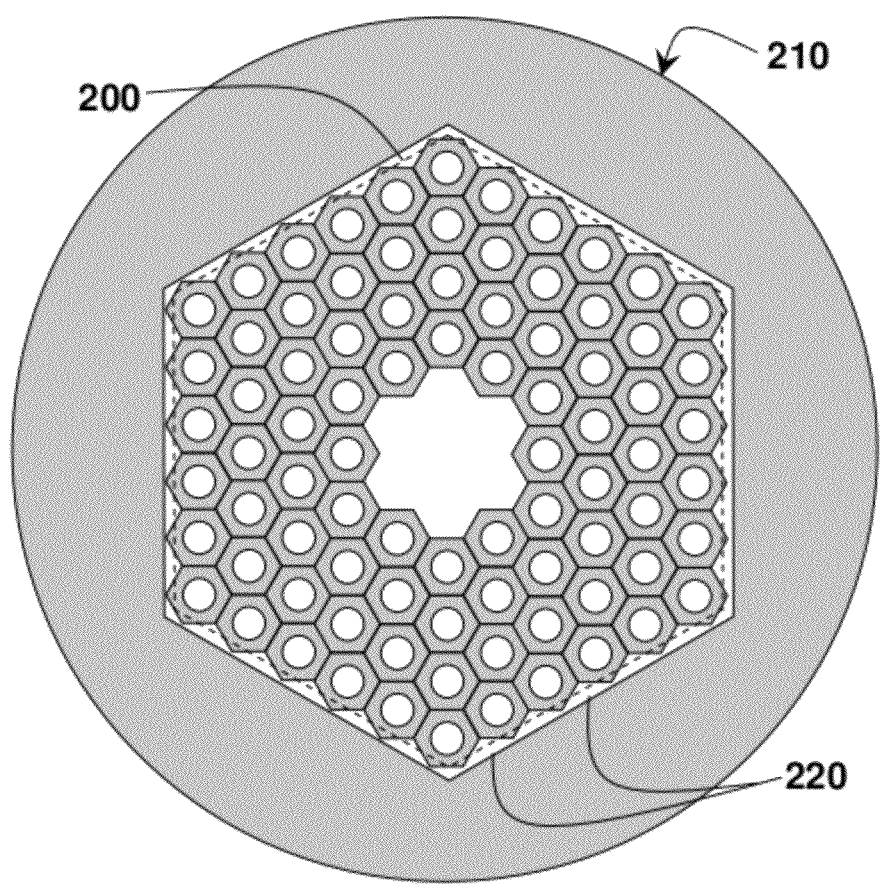

FIG. 2 is a schematic of a PBG fiber preform comprising a structured central region 200, a jacket tube 210, and interstitial voids 220.

Figure 3:
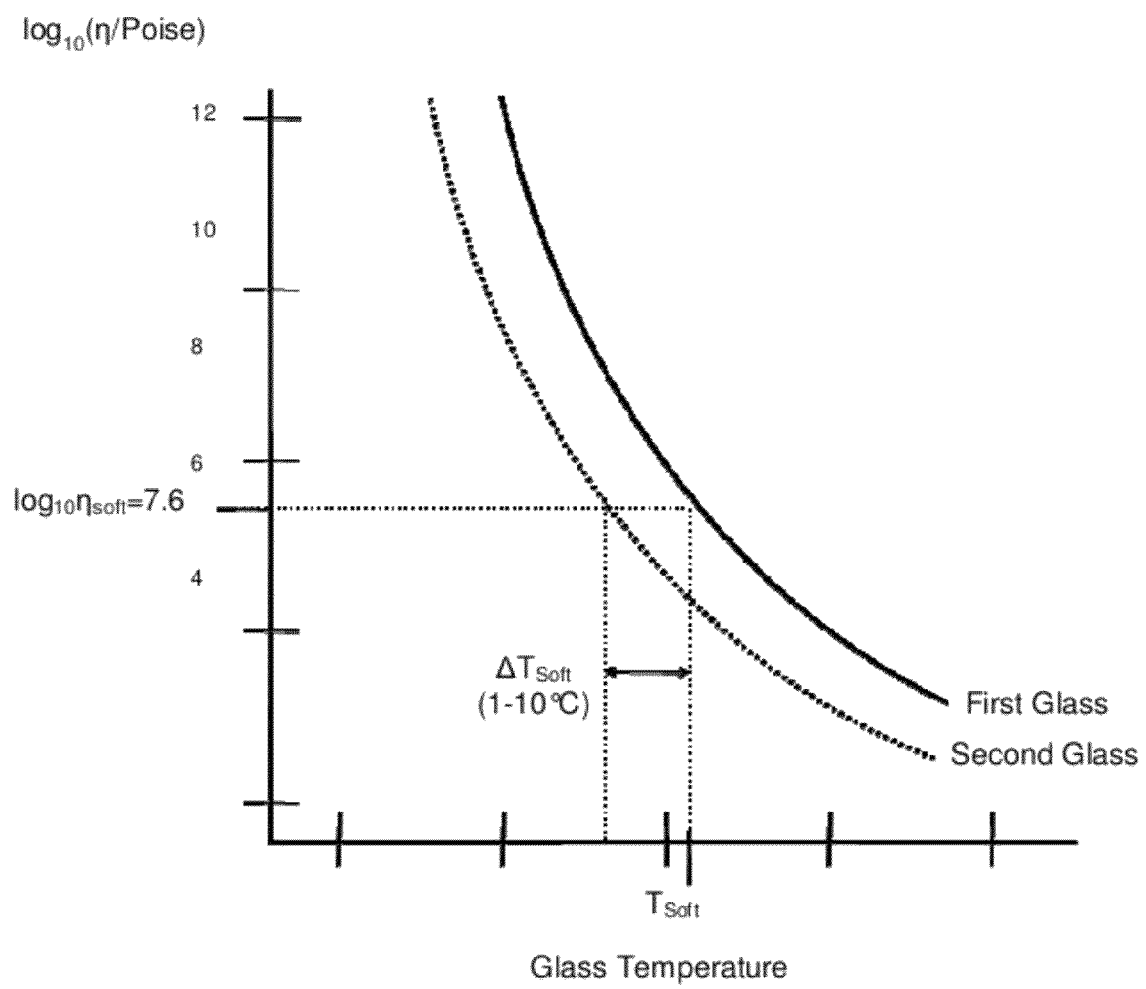

FIG. 3 is a viscosity profile of two glass compositions having a difference in softening temperature ($\Delta T_{soft}$) of 1 to 10° C.

Figure 4:
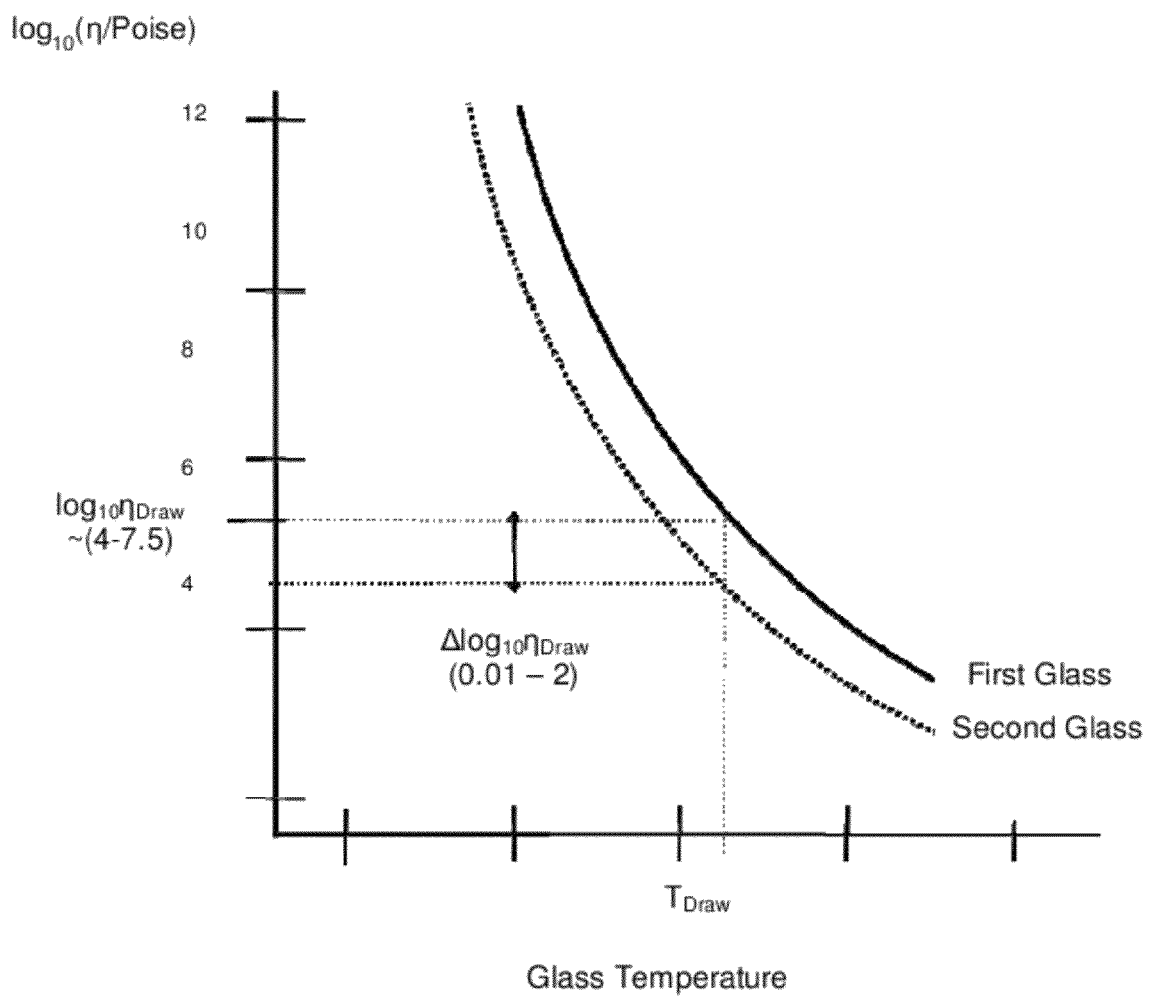

FIG. 4 is a viscosity/temperature profile of two glass compositions with different viscosities at a common fiber draw temperature ($T_{Draw}$) such that the difference of the base ten logarithm of the viscosities in poise is about 0.4, which is in the range of 0.01 to 2.

FIG. 5(a) shows a PBG fiber preform with interstitial voids 220 between the central structured region 200 and the jacket tube 210 as well as internal interstitial gaps 230 within the central structured region 200. FIG. 5(b) shows a PBG fiber preform that was collapsed using a jacket 210 with a 5° lower softening temperature and has a void-free interface between the central structured region 200 and the jacket tube 210 and no internal interstitial gaps within the central structured region 200.

DETAILED DESCRIPTION OF THE INVENTION

According to the present invention, a structured photonic band gap fiber and/or fiber preform uses at least two different compositions of non-silica based specialty glass in the same fiber and/or fiber preform to reduce or eliminate the interstitial voids in the structured fiber preform and/or the fiber. As shown in FIG. 2, the structured central region 200 of the fiber preform comprises a specialty non-silica based glass whose composition is chosen such that it has the desired optical properties for band gap guidance at the wavelength of interest. The central structured region 200 of the fiber preform has open holes that run the length of the fiber preform in predetermined positions. The structured central region 200 is surrounded by a jacket 210 comprising a different composition of a non-silica based glass than the structured central region 200. The jacket 210 may be a jacket tube. The jacket 210 has a single open hole which runs the length of the fiber preform and can be round or some other shape (e.g., hexagonal) which more closely matches the outer shape of the structured central region 200. The jacket 210 is comprised of a glass similar to that of the structured region 200, except that its composition differs slightly so as to yield either (a) a Littleton softening temperature that is at least 1° C. but not more than 10° C. lower than the Littleton softening temperature of the glass of the structured region 200 (see FIG. 3); (b) a glass viscosity at a fiber draw temperature that is lower than the glass viscosity of the glass of the structured region 200 and the base ten logarithm of the glass viscosity in poises differs by at least 0.01 but no more than 2 (see FIG. 4); or both (a) and (b). Between the structured central region 200 and the jacket 210 are interstitial voids 220. These interstitial voids 220 lead to significant problems when the fiber preform is drawn into a fiber.

Before fiber drawing, the assembled fiber preform may or may not be collapsed in a furnace in a controlled atmosphere or under vacuum at a temperature corresponding to a glass viscosity in the range of about $10^8$ to $10^{14}$ poises, with or without the assistance of gas pressure applied to the intended holes, and/or vacuum applied to the interstitial voids. Irrespective of whether the assembled fiber preform undergoes collapse, it is stretched on a fiber draw tower at a temperature corresponding to a glass viscosity in the range of about $10^4$ to $10^{7.5}$ poises, into a fiber with considerably smaller dimensions than the fiber preform.

Figure 5:
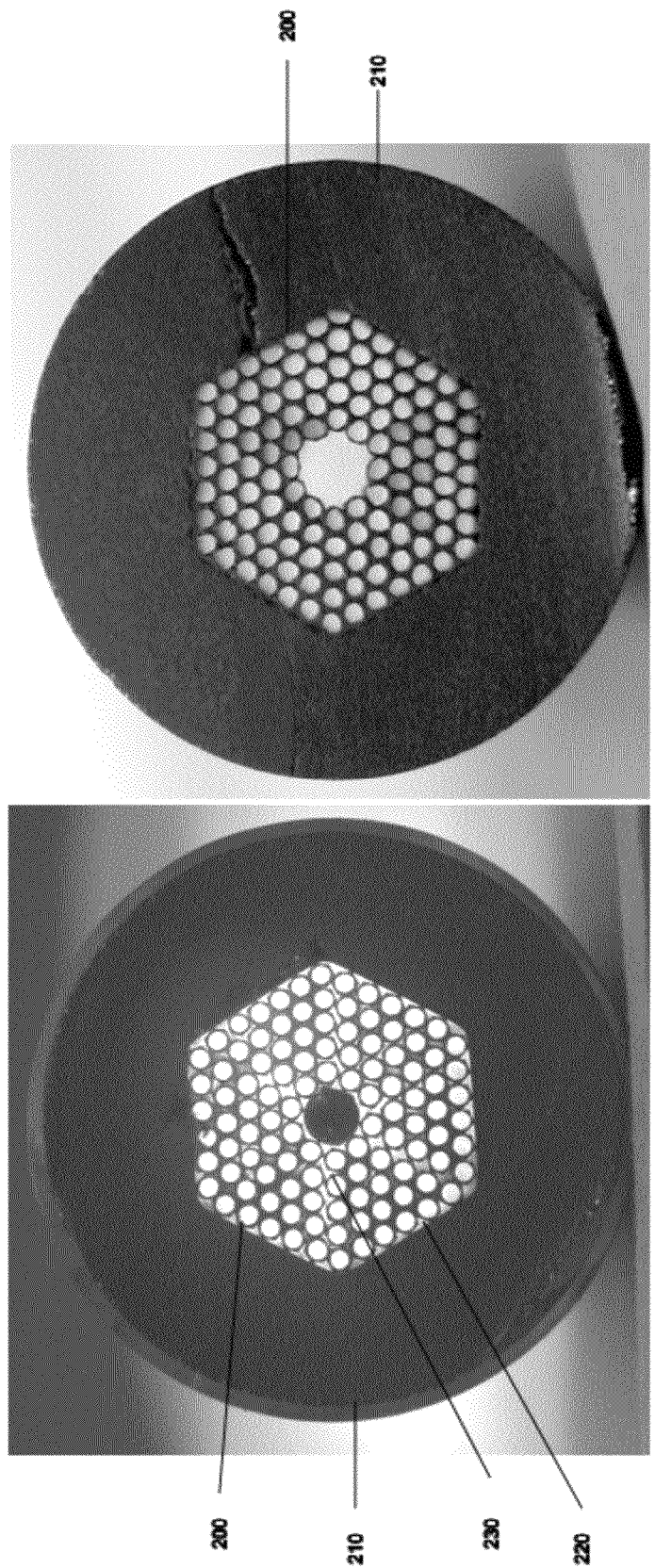

FIG. 5 shows two structured chalcogenide glass HC-PBG fiber preforms. FIG. 5a highlights what happens to a structured fiber preform that has the same glass for both the structured region and the jacket. Interstitial voids 220 are clearly evident between the central structured region 200 and the jacket tube 210. Additionally, there are internal interstitial gaps 230 within the central structured region 200. These interstitial voids 220 and internal interstitial gaps 230 can lead to significant problems during fiber drawing. FIG. 5b highlights what happens when the jacket tube 210 has a lower softening temperature than the glass comprising the structured region 200. The interstitial voids and internal interstitial gaps are not present, which means that the fiber can be drawn without interstitial defects.

The fiber preform in FIG. 5b was inserted into a tight-fitting heat-shrinkable Teflon sleeve and heated to a temperature of 170° C. in a vacuum of approximately $5 \times 10^{-5}$ Torr, such that the glass of the jacket tube flowed into and filled the interstitial voids between the central region and the jacket tube. The difference between the Littleton softening temperatures for the glass of the jacket tube (181° C.) and the glass of the central region (186° C.) was 5° C. The difference between the Littleton softening temperatures for the glass of the jacket tube (263° C.) and the glass of the central region (268° C.) was 5° C.

The present invention pertains to HC-PBG fibers made from non-silica based specialty glasses such as chalcogenide glasses including sulfides, selenides, tellurides and their mixtures, as well as chalcohalide glasses and other oxide glasses, including specialty silicates, germanates, phosphates, borates, gallates, tellurites, and their mixtures. It is also possible to apply this methodology to halide glasses such as fluorides. Fabrication of the HC-PBG fiber preforms using the tube stacking technique is only one example of fabricating these microstructured fiber preforms and the central structured region of the fiber preforms. Other techniques such as extrusion, templating, laser machining, chemical etching or mechanical drilling of glass, any combination of these, and other glass forming and shaping techniques may be used to fabricate the HC-PBG fiber preforms or the central structured region of the fiber preforms or any portion thereof. Additionally, if the tube stacking technique is used, any shape of tube may be used.

Figure 1:
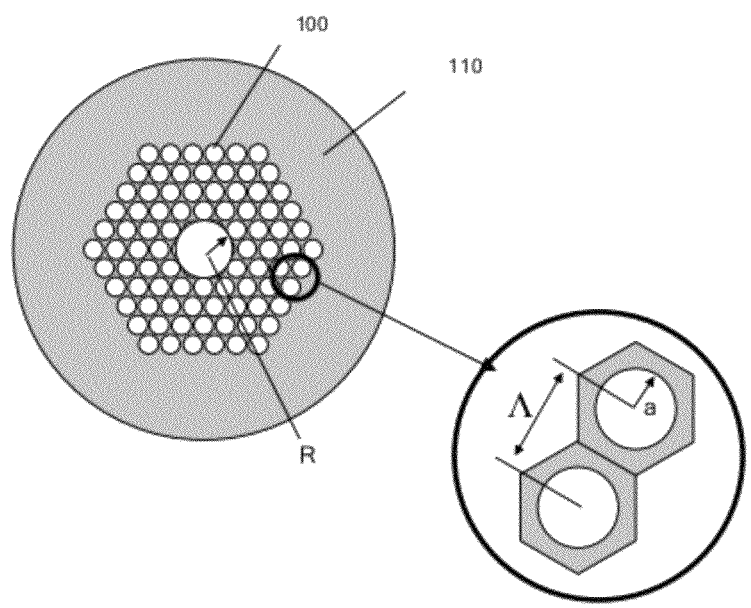
FIG. 1 is a schematic of a cross-section of a PBG fiber where R is the core radius, A is the hole spacing (periodicity), a is the air hole radius, and fill is the air to solid (glass) ratio and represented by the following equation.

The method of reducing interstitial voids in a structured fiber preform by using a jacket tube with a depressed softening temperature may also be applied to photonic crystal fibers in which there is a solid core surrounded by an array of holes. Furthermore, it is not limited to the type of structure shown in FIG. 1, but can also be used for more complex structures.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method of making a photonic band gap fiber preform, comprising the steps of:
   providing a preform consisting of a central structured region and a jacket;
   wherein the central structured region comprises a first non-silica based glass, and wherein the first glass has a Littleton softening temperature; and
   wherein the jacket comprises a second non-silica based glass, wherein the second glass has a Littleton softening temperature, wherein the second glass comprises a different composition than the first glass, and wherein the Littleton softening temperature of the second glass is at least one but no more than ten degrees Celsius lower than the Littleton softening temperature of the first glass;
   surrounding the central structured region with the jacket; and heating the jacket and central structured region wherein the second non-silica based glass flows into and fills any voids between the central structured region and the jacket.

2. The method of claim 1, wherein the first glass and second glass are individually selected from the group consisting of chalcogenide glass, chalcohalide glass, oxide glass, silicate glass, germanate glass, phosphate glass, borate glass, gallate glass, tellurite glass, and halide glass.

3. The method of claim 1, wherein the fiber preform is collapsed in a furnace at a temperature corresponding to a glass viscosity in the range of about $10^8$ to $10^{14}$ poises.

4. The method of claim 1, wherein the fiber preform is drawn into a photonic band gap fiber.

* * * * *